United States Patent [19]

Orban et al.

[11] Patent Number: 4,764,665
[45] Date of Patent: Aug. 16, 1988

[54] ELECTRICALLY HEATED GLOVES

[75] Inventors: Ralph F. Orban; Clifford Lewis, both of Columbus, Ohio

[73] Assignee: Material Concepts, Inc., Columbus, Ohio

[21] Appl. No.: 20,306

[22] Filed: Mar. 9, 1987

Related U.S. Application Data

[63] Continuation-in-part of Ser. No. 750,960, Jul. 2, 1985, abandoned.

[51] Int. Cl.$^4$ .............................................. H05B 3/34
[52] U.S. Cl. ..................................... 219/549; 219/211
[58] Field of Search ............... 219/211, 527, 528, 529, 219/549

[56] References Cited

U.S. PATENT DOCUMENTS

| | | | |
|---|---|---|---|
| 1,011,574 | 12/1911 | Carron | 219/211 |
| 1,284,378 | 11/1918 | Lemercier | 219/211 |
| 2,227,781 | 1/1941 | Joy | 219/211 |
| 2,277,772 | 3/1942 | Marick | 219/527 |
| 3,781,514 | 12/1973 | Olson | 219/211 |
| 4,021,640 | 5/1977 | Gross | 219/527 |

Primary Examiner—Clifford C. Shaw
Assistant Examiner—Teresa J. Walberg
Attorney, Agent, or Firm—John L. Gray

[57] ABSTRACT

A heated glove includes an electrically heated woven fabric in which the fabric has been coated with electrically conducting metal to enable its use as a heating element. The fabric heating element is in the shape of the front and back of a hand with the front and back being electrically connected together only at the tips of the fingers, and is disposed between inner and outer insulating fabric layers.

2 Claims, 2 Drawing Sheets

ELECTRICALLY HEATED GLOVES

BACKGROUND OF THE INVENTION

This is a continuation-in-part application of U.S. patent application Ser. No. 750,960, filed July 2, 1985, ELECTRICALLY HEATED FABRICS now abandoned.

In a conventional electric blanket, heating pad, or the like, a continuous wire heating element is wound back and forth between the two layers of fabric and when electric current is applied to the wire, the wire heats up as a result of resistance heating to warm the fabric, which is in the form of a garment or blanket, and thus the wearer or the user is also warmed.

In such construction, if a break in the wire occurs the current will be interrupted and the heating will cease. A sheet of electric current conducting fabric will not have this disadvantage.

As is well known, ice accumulates on aircraft wings, engine air inlets, and helicopter rotors at high altitudes. This, in turn, causes drag and eventually the aircraft will crash. Current deicing systems range from resistive wire strip heaters to pneumatic rubber boot systems and hot engine exhaust bleed systems. Resistive wires may be attached to or imbedded within the airfoil, and an electrical current passed through the wire to heat and deice the airfoil. With the hot air bleed systems, exhaust gas from the engine is passed through appropriate ducts in the wing, for example, to heat the surrounding areas. With the pneumatic boot systems, the airfoil is covered with a polymeric (rubber) bladder. When ice collects on it, air is passed into the bladder causing the bladder to expand which in turn cracks the ice to remove it.

The prior art discloses a number of sheet-like heating electrically conducting elements in apparel, blankets, and the like. U.S. Pat. No. 2,261,072, Monahan, discloses metalized rubber soles for static electric discharge. This is a sheet-type of electric conductor but does not utilize a source of energy to produce heat. U.S. Pat. No. 3,099,540, Eisler, uses metal foil as a conductor and heating element. U.S. Pat. No. 3,558,848, Luger, Jr., uses a semiconductor for a sheet-like heating element. U.S. Pat. No. 4,061,898, Murray, et al., uses foil. U.S. Pat. No. 3,385,959, Ames, et al., uses an electric conducting heating sheet of elastomeric material. U.S. Pat. No. 3,627,988, Romaniec, uses nonwoven carbon fibers incorporated in a loosely woven textile fiber where the carbon is the electrical conductor. U.S. Pat. No. 3,808,403, Kanaya, et al., uses a nonwoven fabric coated with carbon containing paint as the electrical conductor. U.S. Pat. No. 4,250,397, Gray, et al., discloses a graphite fiber loaded impregnated paper saturated with a binder. U.S. Pat. No. 4,158,078, Egger, et al., discloses a conductive material in which electric conductive particles are impregnated into a glass fiber mat. U.S. Pat. No. 3,781,514, Olson, et al., discloses an electrically heated glove having a flexible lattice structure of plastic material having electric heated wire embedded therein. In this patent the electric wires completely encircle the fingers in the hand of the wearer thus not generating any significant resistance to the flow of electric current. British Pat. No. 581,212, Suchy, discloses a metalized fabric which has been metalized after weaving or knitting. However, none of these references disclose fabric which is metalized after being formed in a glove structure so that maximum heat is generated by the configuration of the fabric in the glove, nor do any of these references have anything to do with airfoils or other aircraft parts.

SUMMARY OF THE INVENTION

The invention involves woven fabrics which have been metalized following weaving which are included as a heating element in a glove or an airfoil or other aircraft parts. Electrical connections through suitable metallic busbars are made to opposite ends of the fabric, thus permitting current flow throughout the entire surface of the fabric. A puncture or tear of the fabric will not cause failure of the system. In the case of a glove, the fabric so constructed is provided on both sides with additional fabric to insulate the wearer or user from the electrically conducting fabric.

In the case of an airfoil, a metal coated fabric strip replaces the resistive wire which is used in the leading edge of the airfoil, whether the airfoil be a wing or some other portion of the aircraft such as a helicopter rotor blade. This fabric strip may be on the wing surface or embedded within the wing.

In the case of an epoxy composite wing, or other airfoil, the composite material which is used for reinforcing the composite could also be the heating element. The electric current passes through the wire at one end of the fabric strip through the strip and then through a wire at the opposite end back to the source of electrical current.

In the case of the prior art, if the resistive wire is damaged or broken no heat would be produced.

In the instant invention the entire fabric strip would have to be broken to stop the circulation of electric current. This may be especially important if either the wing or tip is embedded in an epoxy composite at the time the wing is formed. Once the epoxy composite is set it would be extremely difficult to find and repair a broken wire.

The invention may also be useful for small surface areas in aircraft which must be free of ice but are far removed from the engine area where it would be difficult to channel the hot engine exhaust to them.

The advantages of the instant invention over the resistive wire system are threefold. First, a break in the resistive heating system wire renders the heating feature inoperable; holes and tears to the instant invention panels may reduce the amount of heat generated but would not totally shut down the system. Secondly, with the resistive wire system the heat is concentrated along the conductive path of the wire and results in hot spots. With the instant invention there is a larger conductive path, namely the woven panels, which causes a more uniform distribution of electric current over the surface and thus a more uniform distribution of heat. Thirdly, a glove with a resistive wire system which has the wire running around each digit to conduct the heat limits the mobility of the digits, whereas, the instant invention using the fabric panels is much more flexible permitting greater dexterity and can be used with or without electrical or thermal insulation.

It is therefore an object of this invention to provide an electrically conductive fabric, which may be formed into a glove or airfoil leading edge.

It is a still further object of this invention to provide such a fabric wherein the individual fibers are coated with metal following weaving or arranging in a nonwoven format.

These together with other objects and advantages of the invention will become apparent from the following detailed description of the invention.

DETAILED DESCRIPTION OF THE INVENTION

Figure 1:
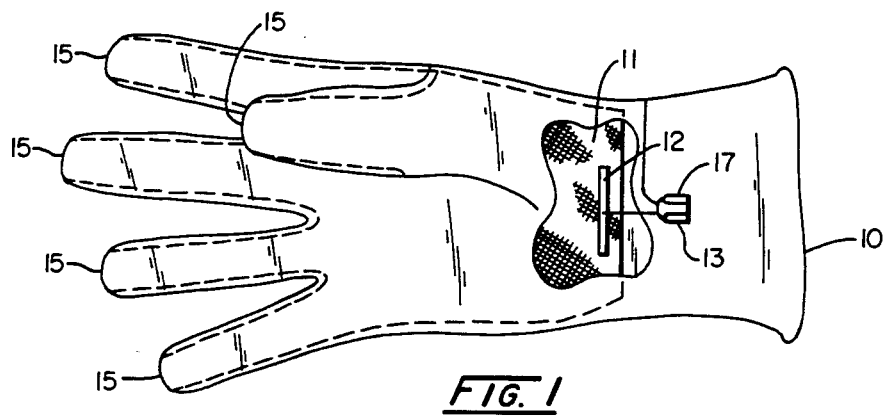
FIG. 1 is a plan view with portions partially removed, showing a glove constructed from a fabric of this invention.
Figure 2:
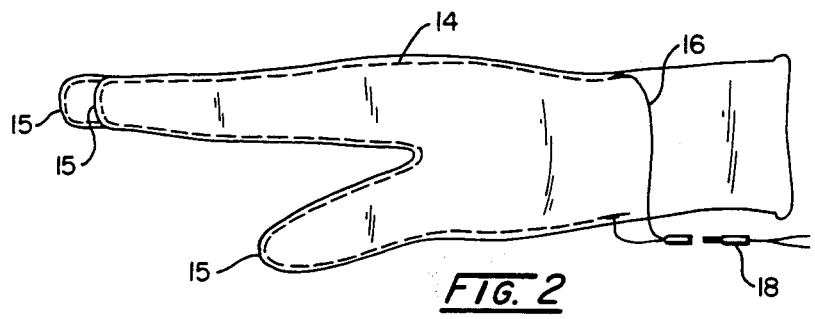
FIG. 2 is a side elevation view of the same glove.

Referring now more particularly to FIG. 1 and FIG. 2, at FIG. 1 a glove 10 is shown provided with a metal-coated fabric 11 to which is affixed a copper busbar 12 connected to an electrical connection 13. This metal-coated fabric 11 extends over the palm and inner finger surfaces of the glove and is connected to the back of the hand and back of the finger portions 145 of the glove shown in FIG. 2. At the fingertips 15—15 only the portion of the metal-coated fabric 14 on the back of the fingers and hand of the glove are connected to the palm portion 11 of the metal-coated fabric and through a suitable busbar and wire 16 to the other side of the electrical connection 17. This in turn may be connected to an appropriate connector 18 which is connected to a source of energy such as a battery. The metalized fabric layer is disposed between inner and outer insulating fabric layers which are formed into a glove. If a plain fabric glove were entirely coated with metal and connections as at 17 and 13 were made and the electrical current entering through one of the wires 13 would take the path of least resistance to the other wire. In this case the current would travel around the wrist to the other wire and while it would heat the wrist portion of the glove, there would be no driving force to cause the current to pass through the palm or digits and thus these would not be heated. An example of such a structure is U.S. Pat. No. 3,781,514, Olson, et al.

The fibers may be made of fabric such as polyaramid, polyester, cotton, or other appropriate fabrics and may be metal coated either in multi-filament form and then woven into the fabric or may be metal coated in the as woven or the nonwoven formed state with metal coatings such as copper, nickel, silver, or a combination of these. Among the coating processes, which may be used, are those disclosed in copending U.S. patent application Ser. Nos. 729,774, Orban; 729,773, Orban; and 729,827, Orban.

Figure 3:
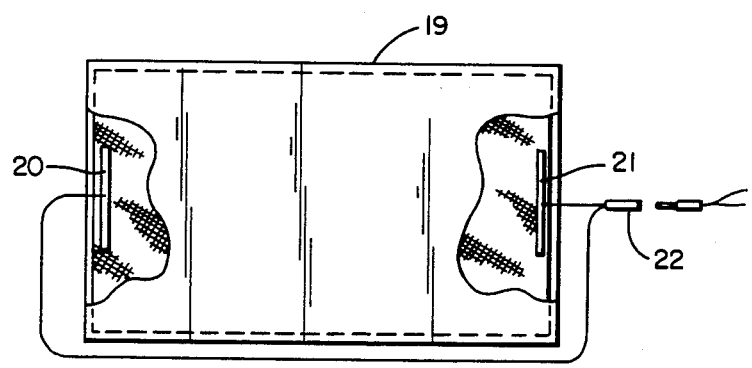
FIG. 3 is a plan view of a blanket prepared in accordance with this invention.

Referring now more particularly to FIG. 3, a typical electric blanket 19 is shown having connections 20 and 21 thereto, which are connected to an appropriate source of direct current energy at connector 22. While it is preferred to use direct current as a source of energy, alternating current may be used where appropriate.

Figure 4:
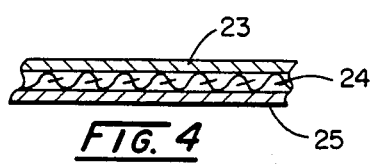
FIG. 4 is an enlarged side elevation section of FIG. 3 showing the three layers of the blanket.

Referring now more particularly to FIG. 4, there is shown an enlarged section of the blanket shown in FIG. 3 showing an outer layer 23, the inner electrical conducting layer 24 and the other outer layer 25. The fabrics formed in this fashion may be fashioned into electric blankets, gloves, heating pads, or other pieces of wearing apparel, such as socks, etc., where it is desirable to provide heat for the wearer or the user from a source of electrical energy.

Such finished articles may be subjected to tears or punctures and the heating function will not be materially impaired. Also, because the product is made from conventional flexible fabric material, such as polyaramid, polyester, cotton, or other appropriate materials, the resulting article will have flexibility which could not otherwise be achieved with metallic foils, graphite, or other brittle materials.

Figure 5:
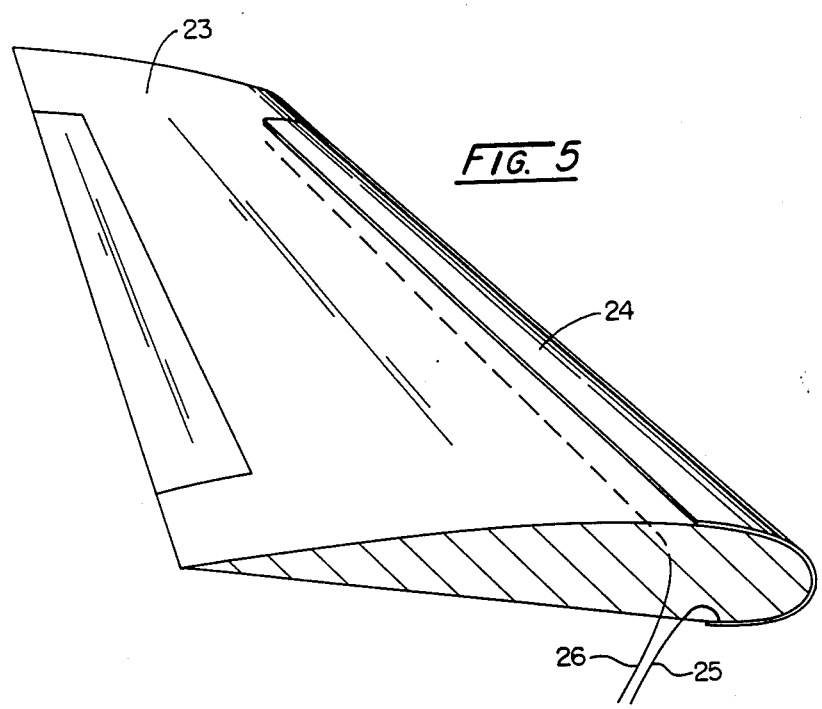
FIG. 5 is a perspective view of an aircraft wing utilizing the instant invention.

Referring now more particularly to FIG. 5, a conventional wing 23 is shown with a metalized fabric 24 surrounding the leading edge of the wing. The metalized fabric 24 is connected at one end to lead 25 and the other end to lead 26. This enables the entire surface of the leading edge of the wing to be electrically heated and if there should be a break or tear in the fabric, the heating function will still continue.

Figure 6:
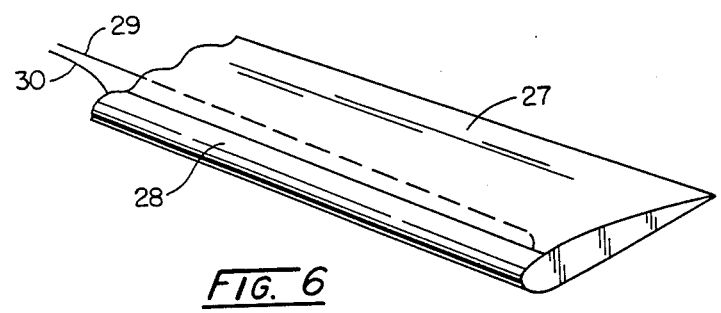
FIG. 6 is a perspective view of another airfoil, such as a helicopter rotor blade, using the instant invention.

Referring now more particularly to FIG. 6, there is disclosed an airfoil 27, such as in a helicopter rotor blade leading edge which is also provided with a metalized fabric 28, one end of which is connected to lead wire 29 and the other end of which is connected to lead wire 30. This functions much the same as the heating element of metalized fabric 24 in FIG. 5.

In the case of an epoxy composite airfoil, the composite material which is used for reinforcing the composite would also be the heating element. In other words, the metalized fabric 24 or 28 would have the dual function of reinforcing the composite and also consisting of the heating element.

While this invention has been described in its preferred embodiment, it is appreciated that slight variations may be made without departing from the true scope and spirit of the invention.

What is claimed is:

1. A heated glove including a heating element comprising a flexible electrically conducting fabric shaped as a front and back of a hand including finger portions, said front and back being electrically connected together at tips of the finger portions only and being provided with electrical insulation connecting said front and back at all other points where the heating elements are formed together in the shape of a hand.

2. The heated glove of claim 1 wherein an inner fabric layer and an outer fabric layer covering and separated by said heating element are provided, opposing wrist portions of said conducting fabric being provided with means for connecting said fabric to a source of electrical energy.

* * * * *